United States Patent
Kim

(10) Patent No.: US 9,939,836 B2
(45) Date of Patent: Apr. 10, 2018

(54) INTERNAL VOLTAGE GENERATION CIRCUIT AND SEMICONDUCTOR DEVICE INCLUDING THE SAME

(71) Applicant: SK hynix Inc., Gyeonggi-do (KR)

(72) Inventor: Yeon-Uk Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/653,057

(22) Filed: Jul. 18, 2017

(65) Prior Publication Data

US 2017/0315579 A1 Nov. 2, 2017

Related U.S. Application Data

(62) Division of application No. 14/738,387, filed on Jun. 12, 2015, now Pat. No. 9,740,231.

(30) Foreign Application Priority Data

Feb. 2, 2015 (KR) ........................ 10-2015-0015910

(51) Int. Cl.
*H02M 3/07* (2006.01)
*G05F 1/46* (2006.01)
*G05F 3/26* (2006.01)

(52) U.S. Cl.
CPC .............. *G05F 3/262* (2013.01); *G05F 1/465* (2013.01); *H02M 3/07* (2013.01); *H02M 3/073* (2013.01); *H02M 2003/072* (2013.01)

(58) Field of Classification Search
CPC .......... G05F 1/465; H02M 3/07; H02M 3/073
See application file for complete search history.

(56) References Cited

U.S. PATENT DOCUMENTS

| 9,368,236 B2* | 6/2016 | Ahn ..................... G11C 29/38 |
| 9,721,626 B2* | 8/2017 | Kang ................... G11C 7/1084 |
| 2007/0283076 A1* | 12/2007 | Kim ..................... G06F 13/385 710/315 |
| 2017/0104406 A1* | 4/2017 | Kim ......................... H02M 1/36 |
| 2017/0287386 A1* | 10/2017 | Oh ......................... G09G 3/2092 |

* cited by examiner

*Primary Examiner* — Timothy J Dole
*Assistant Examiner* — Ishrat Jamali
(74) *Attorney, Agent, or Firm* — IP & T Group LLP

(57) ABSTRACT

An internal voltage generation circuit includes a first control signal generation unit suitable for generating a first control signal activated to a level of a second external voltage when a first external voltage is activated, a second control signal generation unit suitable for generating a second control signal that equals the higher of the second external voltage and an internal voltage, and a voltage generation unit suitable for generating the internal voltage by performing a charge pumping operation based on the second external voltage and an oscillation signal while blocking a current flowing through a generation node from which the internal voltage is generated, based on the first and second control signals.

10 Claims, 7 Drawing Sheets

INTERNAL VOLTAGE GENERATION CIRCUIT AND SEMICONDUCTOR DEVICE INCLUDING THE SAME

CROSS-REFERENCE TO RELATED APPLICATION(S)

This application is a division of U.S. patent application Ser. No. 14/738,387 filed on Jun. 12, 2015 which claims priority of Korean Patent Application No. 10-2015-0015910, filed on Feb. 2, 2015. The disclosure of each of the foregoing application is incorporated herein by reference in its entirety.

BACKGROUND

1. Field

Exemplary embodiments of the present invention relate to an internal voltage generation circuit.

2. Description of the Related Art

As semiconductor devices become more highly integrated, the external voltage used lowers. The use of a low external voltage is important for increasing reliability and lowering power consumption. However, not all the circuits within a semiconductor device are driven by an external voltage, and some circuits require a boosted voltage for their operations. This boosted voltage is typically generated through a charge pump circuit.

External voltages are input to semiconductor devices through voltage pads and are transferred to circuits within the semiconductor device through lines that are connected to the voltage pads. Charge pump circuits may generate internal voltages using a main power voltage, VDD (e.g., having a target level of 1.2 V), or a high power voltage, VPPEXT (e.g., having a target level of 2.5 V).

Each of the power voltages VDD and VPPEXT supplied from the outside of the semiconductor device through the voltage pads starts from a specific level (e.g., a ground voltage) and rises up to the respective target levels with a constant slope. When the power voltages VDD and VPPEXT rise, a leakage current may be generated from the charge pump circuit. If the current leakage is too large, an error, such as a booting failure, may occur.

SUMMARY

Various embodiments are directed to an internal voltage generation circuit that may prevent current leakage from occurring, and a semiconductor device including the same.

Also, various embodiments are directed to an internal voltage generation circuit that may prevent errors, such as booting failure, from occurring by preventing current leakage, and a semiconductor device including the same.

In an embodiment, an internal voltage generation circuit may include a first control signal generation unit suitable for generating a first control signal activated to a second external voltage when a first external voltage is activated, a second control signal generation unit suitable for generating a second control signal that equals the higher of the second external voltage and an internal voltage (i.e. that has a voltage equal whichever is higher between the second external voltage and the internal voltage), and a voltage generation unit suitable for generating the internal voltage by performing a charge pumping operation based on the second external voltage and an oscillation signal while blocking a current flowing through a generation node from which the internal voltage is generated, based on the first and second control signals.

In an embodiment, a semiconductor device may include a first voltage transfer line suitable for transferring a first external voltage input through a first voltage pad, a second voltage transfer line suitable for transferring a second external voltage input through a second voltage pad, a third voltage transfer line suitable for transferring an internal voltage, an internal circuit suitable for performing a predetermined operation using the voltages transferred to the first to third voltage transfer lines, an internal voltage generation unit suitable for generating the internal voltage by performing a charge pumping operation based on the second external voltage and an oscillation signal, and an NMOS transistor coupled between the second voltage transfer line and the third voltage transfer line, wherein the NMOS transistor is turned on when the internal circuit is tested.

In an embodiment, a semiconductor device may include a first semiconductor chip including first and second voltage pads, a first NMOS transistor, and a first internal voltage generation unit suitable for generating a first internal voltage based on a voltage input through the second voltage pad and a first oscillation signal, and a first internal circuit that is driven using voltages input through the first and second voltage pads and the first internal voltage, wherein the first NMOS transistor is coupled between the second voltage pad and a first generation node from which the first internal voltage is generated, and turned on when the first internal circuit is tested; a second semiconductor chip including third and fourth voltage pads, a second NMOS transistor, and a second internal voltage generation unit suitable for generating a second internal voltage based on a voltage input through the fourth voltage pad and a second oscillation signal, and a second internal circuit that is driven using voltages input through the third and fourth voltage pads and the second internal voltage, wherein the second NMOS transistor is coupled between the fourth voltage pad and a second generation node from which the second internal voltage is generated, and turned on when the second internal circuit is tested; a first through chip via suitable for coupling the first voltage pad and the third voltage pad to transfer a first external voltage; and a second through chip via suitable for coupling the second voltage pad and the fourth voltage pad to transfer a second external voltage.

In an embodiment, an internal voltage generation circuit may include a control signal generation unit suitable for generating one or more control signals based on first and second external voltages and an internal voltage and a voltage generation unit suitable for generating the internal voltage by performing a charge pumping operation based on the second external voltage and an oscillation signal while blocking a current flowing through a generation node from which the internal voltage is generated, based on the one or more control signals.

DETAILED DESCRIPTION

Figure 1:
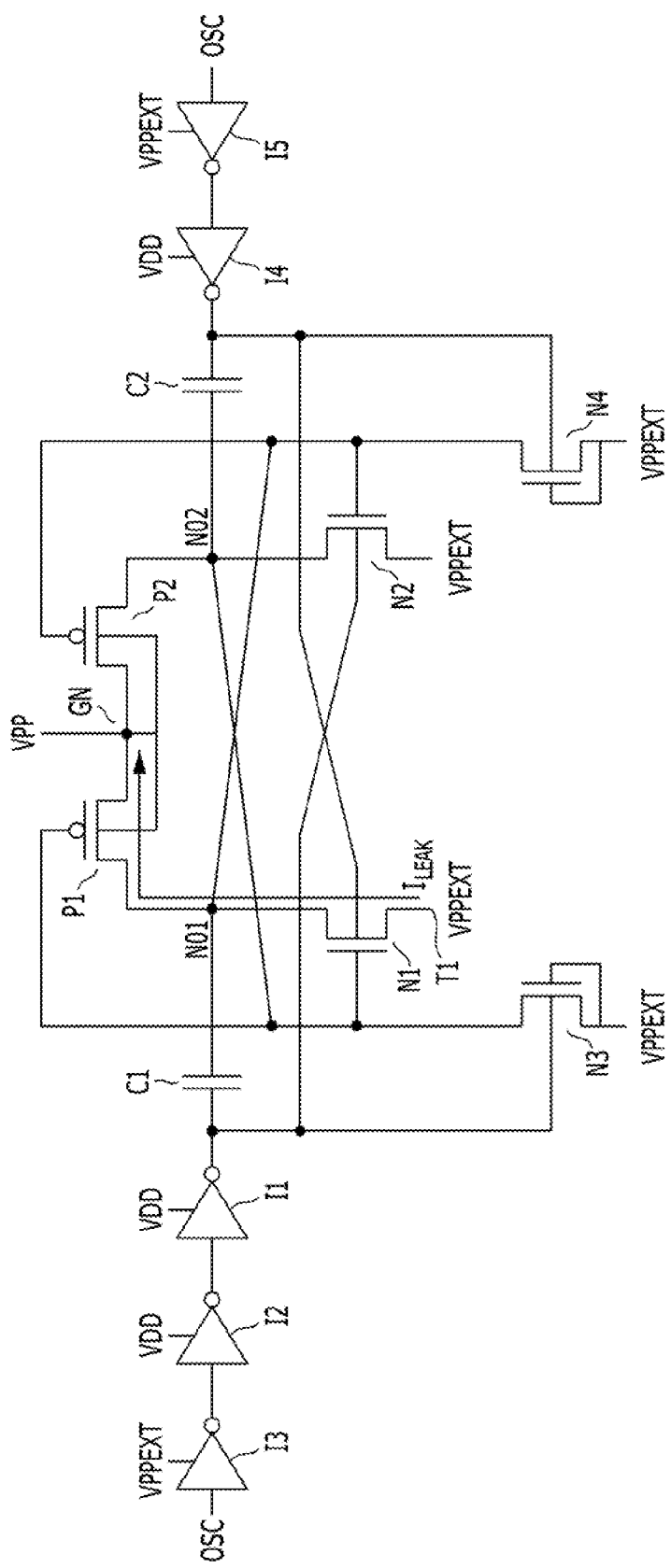
FIG. 1 is a diagram illustrating an internal voltage generation circuit for describing leakage current concerns.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts in the various figures and embodiments of the present invention.

The drawings are not necessarily to scale and, in some instances, proportions may have been exaggerated to clearly illustrate features of the embodiments. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a diagram illustrating an internal voltage generation circuit for describing leakage current concern.

Referring to FIG. 1, the internal voltage generation circuit may include capacitors C1 and C2, PMOS transistors P1 and P2, and NMOS transistors N1 to N4, and inverters I1 to I5. The internal voltage generation circuit may include a charge pump circuit that generates a boosted voltage through a charge pumping operation. The internal voltage generation circuit may generate an internal boosted voltage VPP using external voltages VDD and VPPEXT and an oscillation signal OSC that is periodically toggled. The external voltage VDD may be a main power voltage, and the external voltage VPPEXT may be a high power voltage that is higher than the main power voltage.

The external voltages VDD and VPPEXT are applied to the semiconductor device when the semiconductor device is powered on. The external voltages VDD and VPPEXT rise from a ground level to respective target levels. A period in which an external voltage applied to a semiconductor device rises is called a ramp-up period. In the ramp-up period, the external voltage VPPEXT may first rise from the ground level to the target level, and then the external voltage VDD may rise from the ground level to the target level. The oscillation signal OSC may be in a deactivated state, and the nodes NO1 and NO2 within the internal voltage generation circuit may have a different voltage.

It will be assumed that node NO1 has a low voltage. In this case, the PMOS transistor P1 and the NMOS transistor N1 are turned on in response to the voltage of node NO1, and thus a leakage current $I_{LEAK}$ flows from terminal T1 to which the external voltage VPPEXT is applied and to a node GN from which the internal boosted voltage VPP is generated. The leakage current $I_{LEAK}$ may lead to an error in the operation of a semiconductor device including the internal voltage generation circuit.

Figure 2:
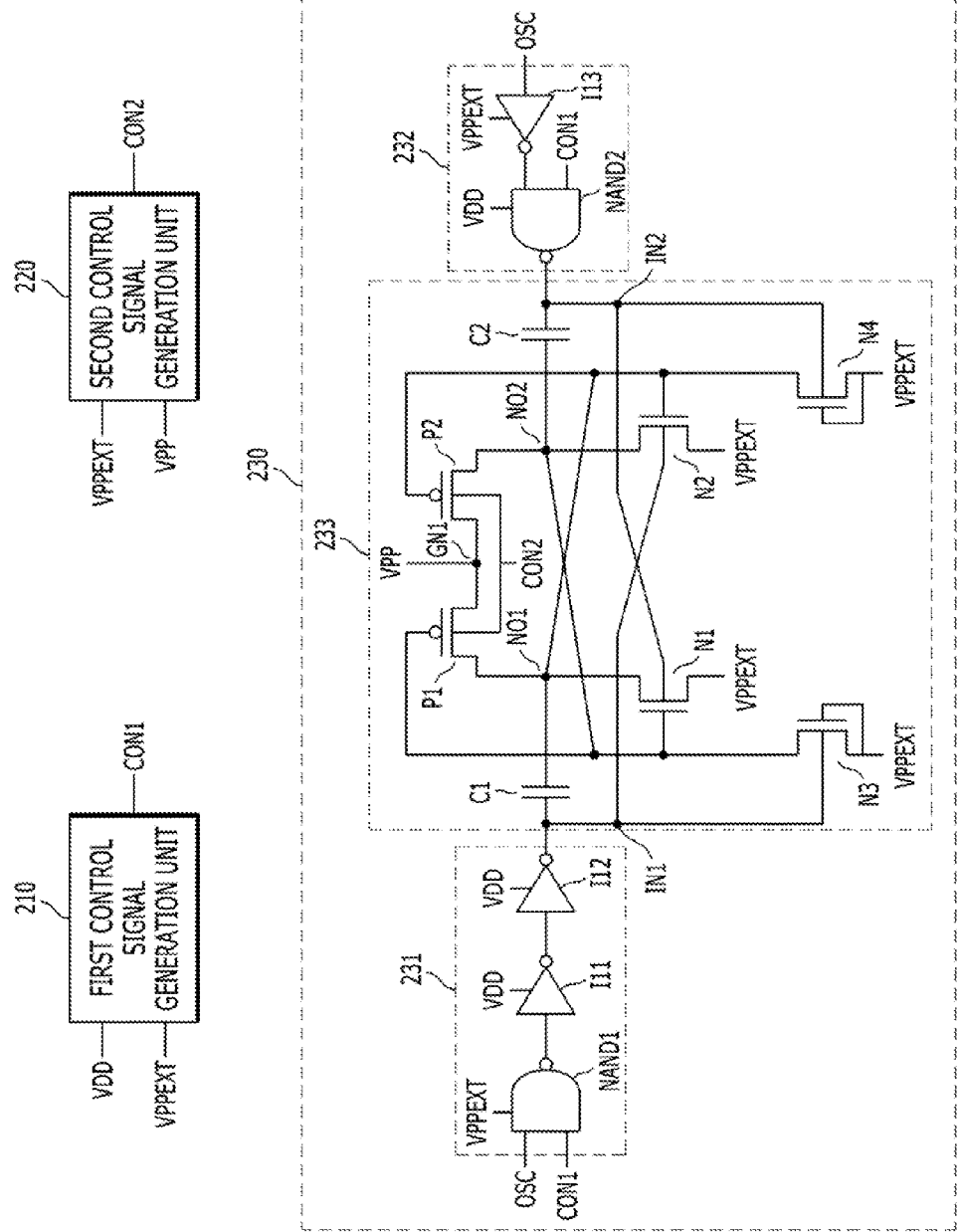
FIG. 2 is a diagram illustrating an internal voltage generation circuit in accordance with an embodiment of the present invention.

FIG. 2 is a diagram illustrating an internal voltage generation circuit in accordance with an embodiment of the present invention.

Referring to FIG. 2, the internal voltage generation circuit may include a first control signal generation unit 210, a second control signal generation unit 220, and a voltage generation unit 230. The voltage generation unit 230 may include a first input unit 231, a second input unit 232, and a charge pumping unit 233. A target level of a second external voltage VPPEXT may be higher than a target level of a first internal voltage VDD.

When the first external voltage VDD is activated, the first control signal generation unit 210 may generate a first control signal CON1 that is activated to the second external voltage VPPEXT. When the first external voltage VDD is deactivated, the first control signal generation unit 210 may deactivate the first control signal CON1. The second control signal generation unit 220 may generate a second control signal CON2 that equals the higher of the second external voltage VPPEXT and the internal boosted voltage VPP.

The voltage generation unit 230 may generate the internal boosted voltage VPP by performing a charge pumping operation in response to the external voltages VDD and VPPEXT and an oscillation signal OSC while blocking the current flowing through a generation node GN1 from which the internal boosted voltage VPP is generated, in response to the control signals CON1 and CON2. The voltage generation unit 230 may include the first input unit 231, the second input unit 232, and the charge pumping unit 233.

When the first control signal CON1 is activated, the first input unit 231 may fix the voltage of a first input node IN1 to a specific voltage (e.g., a logic "high" level). When the first control signal CON1 is deactivated, the first input unit 231 may toggle the voltage of the first input node IN1 in response to the oscillation signal OSC. The first input unit 231 may include a NAND gate NAND1 and inverters I11 and I12. The NAND gate NAND1 may operate using the second external voltage VPPEXT. When the first control signal CON1 is activated to Low, the voltage of the first input node IN1 may be fixed to a logic high level regardless of the level of the oscillation signal OSC. When the first control signal CON1 is deactivated to a logic high level, the voltage of the first input node IN1 may be toggled to a level opposite of the oscillation signal OSC.

When the first control signal CON1 is activated, the second input unit 232 may fix the voltage of the second input node IN2 to a specific level (e.g., a logic "high" level). When the first control signal CON1 is deactivated, the second input unit 232 may toggle the voltage of the second input node IN2 in response to the oscillation signal OSC. The second input unit 232 may include a NAND gate NAND2 and an inverter I13. When the first control signal CON1 is activated to Low, the voltage of the second input node IN2 may be fixed to a logic high level regardless of the level of the oscillation signal OSC. When the first control signal CON1 is deactivated to a logic high level, the voltage of the second input node IN2 may be toggled to the same level as the oscillation signal OSC.

The charge pumping unit 233 may include a first capacitive element C1, a second capacitive element C2, a first PMOS transistor P1, a second PMOS transistor P2, a first NMOS transistor N1, a second NMOS transistor N2, a third NMOS transistor N3, and a fourth NMOS transistor N4. The first capacitive element C1 is coupled between the first input node IN1 and a first internal node NO1. The second capacitive element C2 is coupled between a second input node IN2 and a second internal node NO2. The first PMOS transistor P1 is coupled between the generation node GN1 and the first internal node NO1 and has a gate connected to the second internal node NO2 and a body (or a bulk) to which the second control signal CON2 is applied. The second PMOS transistor P2 is coupled between the generation node GN1 and the second internal node NO2 and has a gate connected to the first internal node NO1 and a body to which the second control signal CON2 is applied. The first NMOS transistor N1 has one end connected to the first internal node NO1, the other end supplied with the second external voltage VPPEXT, a gate connected to the second internal node NO2, and a body connected to the second input node NO2. The second NMOS transistor N2 has one end connected to the second internal node NO2, the other end supplied with the second external voltage VPPEXT, a gate connected to the first internal node NO1, and a body connected to the first input node IN1. The third NMOS transistor N3 has one end connected to the second internal node NO2, the other end and a gate supplied with the second external voltage VPPEXT, and a body connected to the first input node IN1. The fourth NMOS transistor N4 has one end connected to the first internal node NO1, the other end and a gate supplied with the second external voltage VPPEXT, and a body connected to the second input node NO2. For reference, each of the capacitive elements C1 and C2 may be a capacitor.

In a ramp-up period, if the second external voltage VPPEXT rises first and the first external voltage VDD rises next, the voltages of the first and second input nodes IN1 and IN2 may be fixed to a logic high level before the first external voltage VDD rises, and the voltages of the first and second internal nodes NO1 and NO2 may also be fixed to a logic high level due to the coupling effect of the capacitors C1 and C2. Accordingly, the PMOS transistors P1 and P2 may be turned off so that a current does not flow in the generation node GN1. Furthermore, the threshold voltages of the PMOS transistors P1 and P2 may rise and an effect in which the generation node GN1 is blocked may be increased because the second control signal CON2 applied to the bodies of the PMOS transistors P1 and P2 have the same level as the second external voltage VPPEXT.

In a period in which the second external voltage VPPEXT is activated, but the first external voltage VDD is not activated, the voltages of the input nodes IN1 and IN2 of the internal voltage generation circuit are fixed to a specific level, and the threshold voltages of the transistors P1 and P2 connected to the generation node GN1 are increased. Accordingly, leakage current may be prevented from flowing in the generation node GN1.

Figure 3:
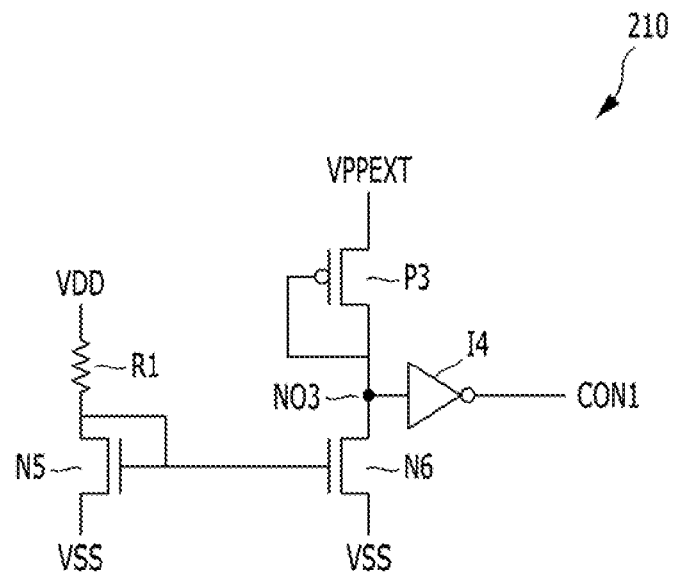
FIG. 3 is a detailed diagram of a first control signal generation unit shown in FIG. 2.

FIG. 3 is a detailed diagram of the first control signal generation unit 210 shown in FIG. 2.

Referring to FIG. 3, the first control signal generation unit 210 may include a resistive element R1, an NMOS transistor N5, a PMOS transistor P3, an NMOS transistor N6, and an inverter I14. The resistive element R1 has one end supplied with the first external voltage VDD. The NMOS transistor N5 has one end connected to the other end of the resistive element R1, the other end supplied with a base voltage VSS, and a gate connected to the other end of the resistive element R1. The PMOS transistor P3 has one end supplied with the second external voltage VPPEXT, the other end connected to a node NO3, and a gate connected to the node NO3. The NMOS transistor N6 has one end connected to the node NO3, the other end supplied with the base voltage VSS, and a gate connected to the gate of the NMOS transistor N5. The inverter I14 receives the voltage of the node NO3 to output the first control signal CON1.

Figure 4:
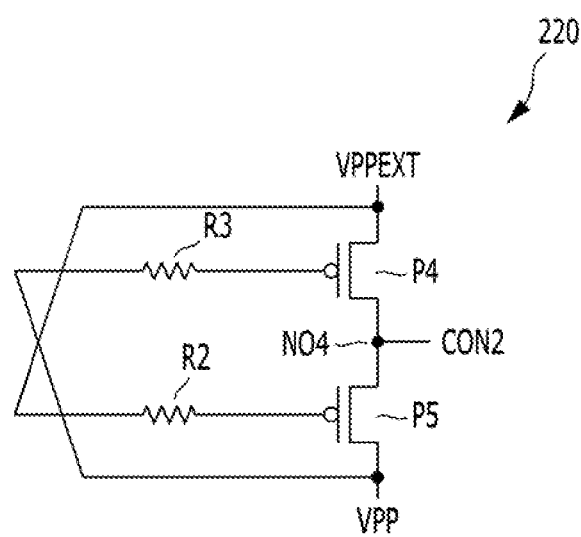
FIG. 4 is a detailed diagram of a second control signal generation unit shown in FIG. 2.

FIG. 4 is a detailed diagram of the second control signal generation unit 220 shown in FIG. 2.

Referring to FIG. 4, the second control signal generation unit 220 may include a PMOS transistor P4 having one end supplied with the second external voltage VPPEXT and the other end connected to a node NO4 from which the second control signal CON2 is generated, a PMOS transistor P5 having one end supplied with the internal boosted voltage VPP and the other end connected to the node NO5, a resistive element R2 coupled between one end of the PMOS transistor P4 and the gate of the PMOS transistor P5, and a resistive element R3 coupled between one end of the PMOS transistor P5 and the gate of the PMOS transistor P4.

Figure 5:
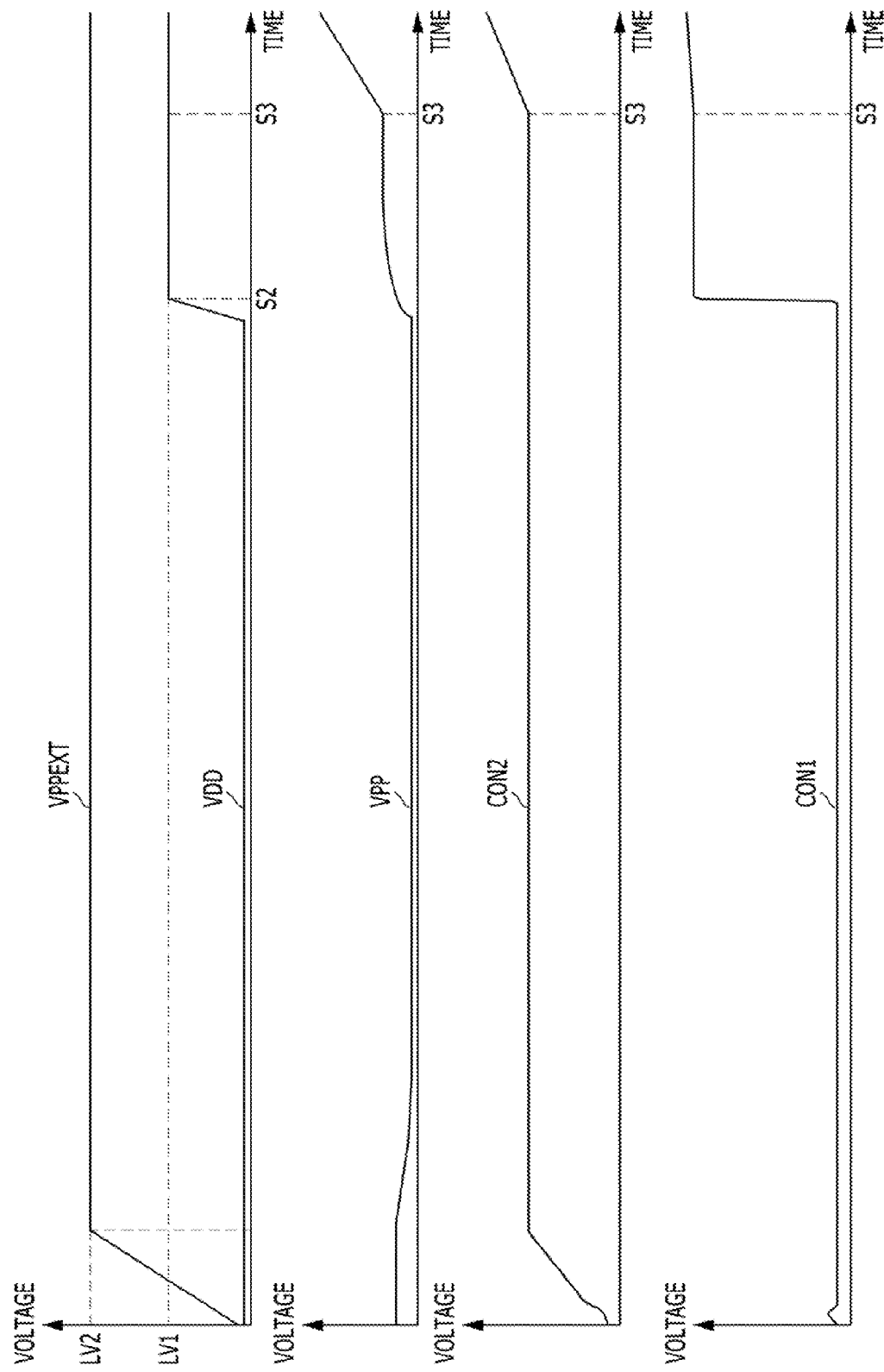
FIG. 5 is a waveform diagram for describing an operation of the internal voltage generation circuit shown in FIG. 2.

FIG. 5 is a waveform diagram for describing an operation of the internal voltage generation circuit shown in FIG. 2.

The operation of the internal voltage generation circuit in a ramp-up period is described with reference to FIG. 5. VDD is a waveform diagram of the first external voltage, VPPEXT is a waveform diagram of the second external voltage, CON1 is a waveform diagram of the first control signal, CON2 is a waveform diagram of the second control signal, and VPP is a waveform diagram of the internal voltage.

When the ramp-up period starts, first, the second external voltage VPPEXT rises and reaches a target level LV2 at step S1. In this case, the first control signal CON1 maintains a deactivation state in a low level, and the second control signal CON2 rises along with the second external voltage VPPEXT and reaches a target level LV2. The internal boosted voltage VPP maintains a low level because the current flowing through the generation node GN1 is blocked by the first and second control signals CON1 and CON2.

The first external voltage VDD rises and reaches the target level LV1 at step S2. When the first external voltage VDD is activated, the first control signal CON1 is deactivated and rises to a logic high level. Accordingly, the voltages of the first and second input nodes IN1 and IN2 may be toggled in response to the oscillation signal OSC. The second control signal CON1 maintains the target level LV2. Thereafter, when the oscillation signal OSC is activated starts to toggle at step S3, the internal boosted voltage VPP rises, and the second control signal CON2 rises along with the internal boosted voltage VPP.

Figure 6:
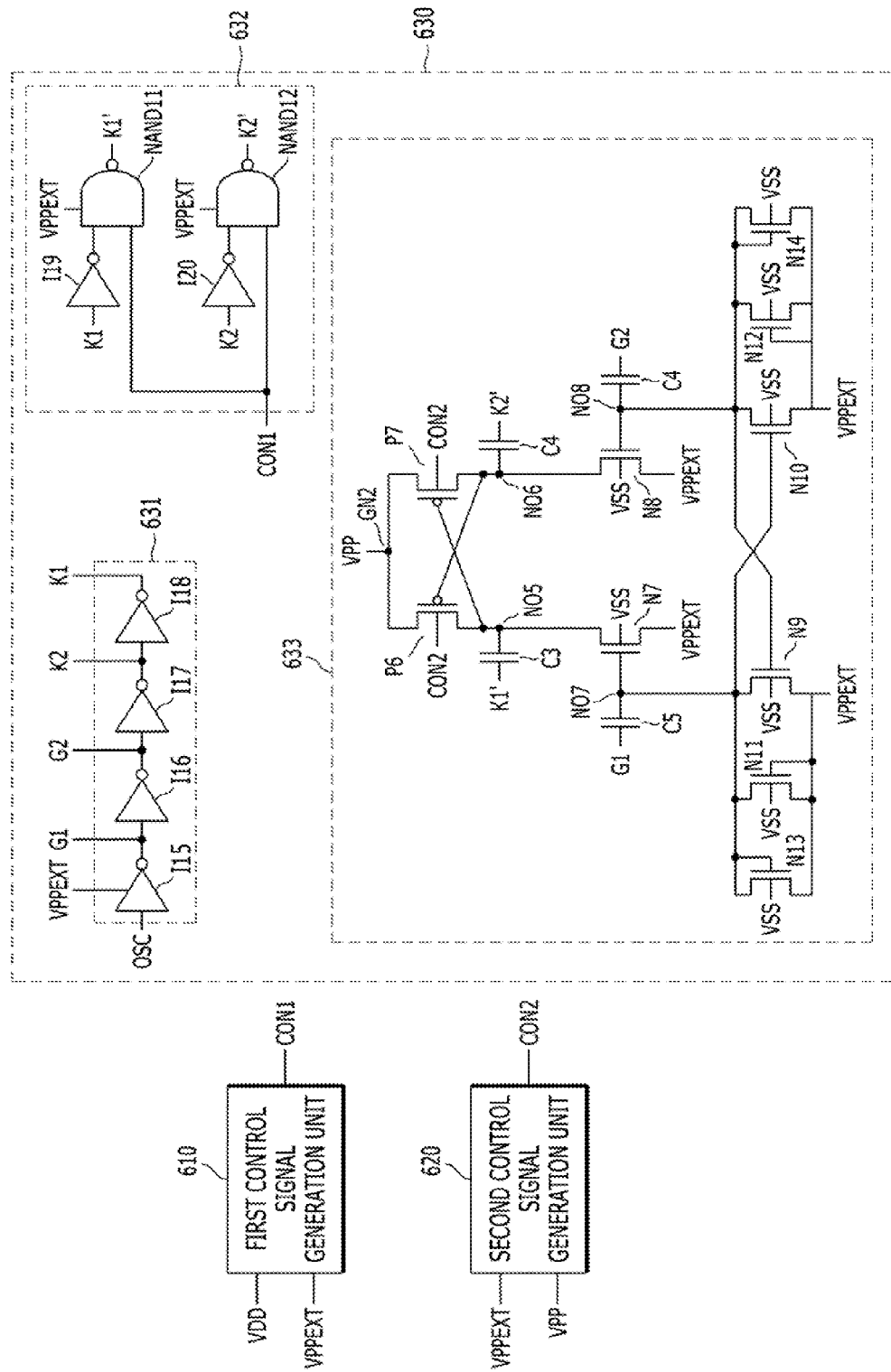
FIG. 6 is a diagram illustrating an internal voltage generation circuit in accordance with an embodiment of the present invention.

FIG. 6 is a diagram illustrating an internal voltage generation circuit in accordance with an embodiment of the present invention.

Referring to FIG. 6, the internal voltage generation circuit may include a first control signal generation unit 610, a second control signal generation unit 620, and a voltage generation unit 630. The voltage generation unit 630 may include a signal generation unit 631, a signal transfer unit 632, and a charge pumping unit 633. The first and second control signal generation units 610 and 620 of FIG. 6 have the same configurations and operate similarly to the first and second control signal generation units 210 and 220 described with reference to FIGS. 2 to 4. The internal voltage generation circuit of FIG. 6 may include a voltage generation unit 630 that is different from the internal voltage generation circuit of FIG. 2. The voltage generation unit 630 may be a charge pump circuit for generating the internal boosted voltage VPP by performing a charge pumping operation.

The signal generation unit 631 may generate a first signal G1 by inverting the oscillation signal OSC, may generate a second signal G2 by inverting the first signal G1, may generate a third signal K2 by inverting the second signal G2, and may generate a fourth signal K1 by inverting the third signal K2. The signal generation unit 631 may include inverters I15 to I18.

The signal transfer unit 632 may fix first and second input signals K1' and K2' to a specific level when a first control signal CON1 is activated and may transfer the fourth signal K1 and the third signal K2 as the first input signal K1' and the second input signal K2', respectively, when the first control signal CON1 is deactivated. The signal transfer unit 632 may include NAND gates NAND11 and NAND12 and inverters I19 and I20.

The charge pumping unit 633 may include a capacitive element C3, a capacitive element C4, a capacitive element C5, a capacitive element C6, a PMOS transistor P6, and a PMOS transistor P7. The capacitive element C3 has one end supplied with the first input signal K1' and the other end connected to an internal node NO5. The capacitive element C4 has one end supplied with the second input signal K2' and the other end connected to an internal node NO6. The capacitive element C5 has one end connected to the first signal G1 and the other end connected to an internal node NO7. The capacitive element C6 has one end supplied with the second signal G2 and the other end connected to an internal node NO8. The PMOS transistor P6 is coupled between a generation node GN2 and the internal node NO5 and has a gate connected to the internal node NO6 and a body supplied with a control signal CON2. The PMOS transistor P7 is coupled between the generation node GN2 and the second internal node NO6 and has a gate connected to the first internal node NO5 and a body supplied with the second control signal CON2.

The charge pumping unit 633 may further include an NMOS transistor N7, an NMOS transistor N8, an NMOS transistor N9, an NMOS transistor N10, an NMOS transistor N11, an NMOS transistor N12, an NMOS transistor N13, and an NMOS transistor N14. The NMOS transistor N7 has one end connected to the internal node NO5, the other end supplied with a second external voltage VPPEXT, and a gate connected to the third internal node NO7. The NMOS transistor N8 has one end connected to the internal node NO6, the other end supplied with the second external voltage VPPEXT, and a gate connected to the internal node NO8. The NMOS transistor N9 has one end connected to the internal node NO7, the other end supplied with the second external voltage VPPEXT, and a gate connected to the internal node NO8. The NMOS transistor N10 has one end connected to the fourth internal node NO8, the other end supplied with the second external voltage VPPEXT, and a gate connected to the internal node NO7. The NMOS transistor N11 has one end connected to the internal node NO7 and the other end and a gate supplied with the second external voltage VPPEXT. The NMOS transistor N12 has one end connected to the internal node NO8 and the other end and a gate supplied with the second external voltage VPPEXT. The NMOS transistor N13 has one end and a gate connected to the internal node NO7 and the other end supplied with the second external voltage VPPEXT. The NMOS transistor N14 has one end and a gate connected to the internal node NO8 and the other end supplied with the second external voltage VPPEXT.

In a ramp-up period, if the second external voltage VPPEXT rises first and the first external voltage VDD rises next, the first and second input signals K1' and K2' may be fixed to a logic high level before the first external voltage VDD rises and the voltages of the internal nodes NO5 and NO6 may also be fixed to a logic high level due to the coupling effect of the capacitors C1 and C2. Accordingly, the PMOS transistors P6 and P7 are turned off, and thus a current may be prevented from flowing in the generation node GN2. Furthermore, the threshold voltages of the PMOS transistors P6 and P7 rise because the second control signal CON2 applied to the bodies of the PMOS transistors P6 and P7 the second external voltage VPPEXT, thereby being capable of increasing an effect that blocks the generation node GN2.

In a period in which the second external voltage VPPEXT is activated, but the first external voltage VDD is not activated, the voltages of the input signals K1' and K2' of the internal voltage generation circuit are fixed to a specific level and the threshold voltages of the transistors P6 and P7 connected to the generation node GN2 are raised. Accordingly, leakage of current may be in the generation node GN2 may be prevented.

Figure 7:
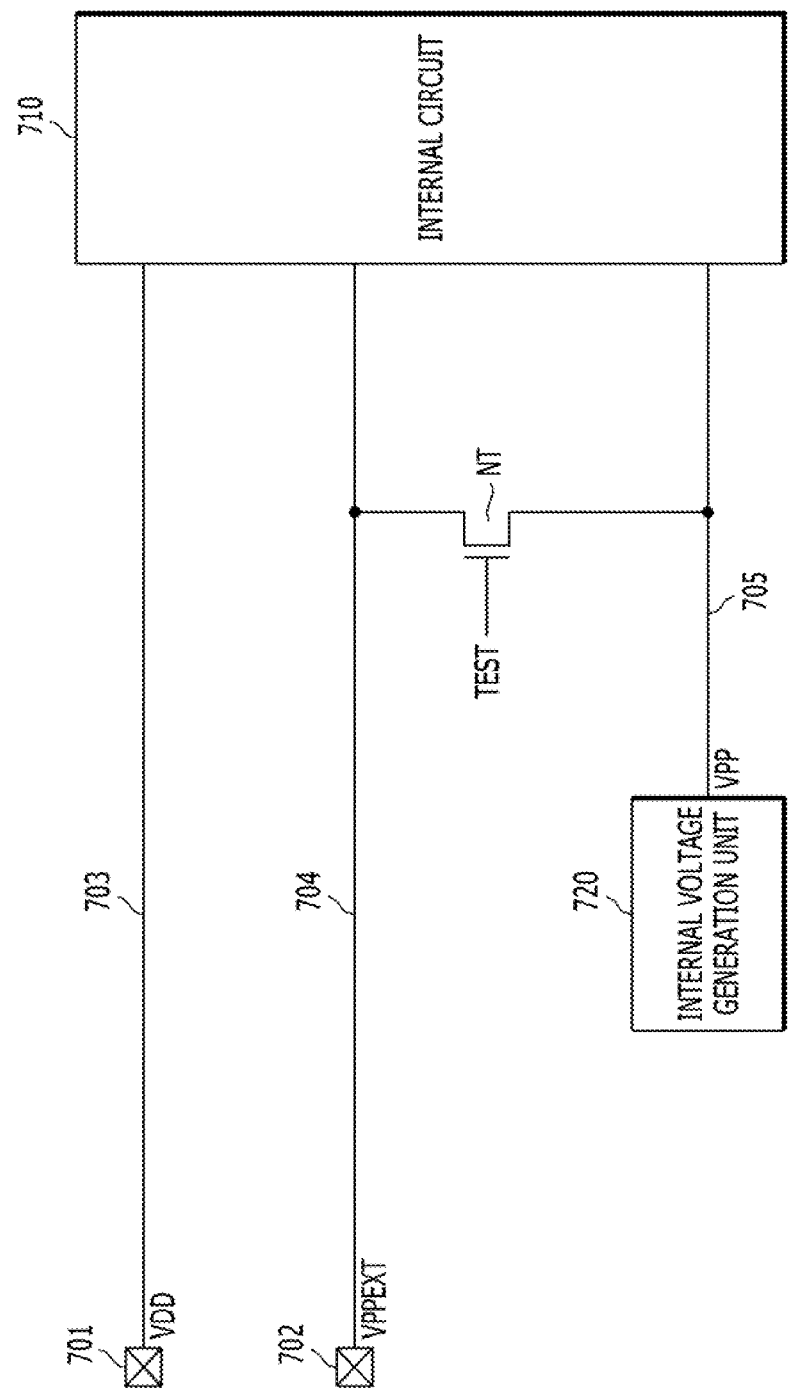
FIG. 7 is a diagram illustrating a semiconductor device in accordance with an embodiment of the present invention.

FIG. 7 is a diagram illustrating a semiconductor device in accordance with an embodiment of the present invention.

Referring to FIG. 7, the semiconductor device may include a first pad 701, a second pad 702, a voltage transfer line 703, a second voltage transfer line 704, a third voltage transfer line 705, an internal circuit 710, an internal voltage generation unit 720, and an NMOS transistor NT. The internal voltage generation unit 720 may include the internal voltage generation circuit of FIG. 2 or 6. Voltages VDD, VPPEXT, and VPP used in the internal voltage generation unit 720 and the internal circuit 710 may be transferred through the respective voltage transfer lines 703 to 705.

The first voltage transfer line 703 may transfer the first external voltage VDD input through the first voltage pad 701. The second voltage transfer line 704 may transfer the second external voltage VPPEXT input through the second voltage pad 702. The third voltage transfer line 705 may transfer the internal boosted voltage VPP generated by the internal voltage generation unit 720.

The internal circuit 710 may perform a specific operation using the voltages VDD, VPPEXT, and VPP transferred to the voltage transfer lines 703-705. For example, if the semiconductor device is a memory device, the internal circuit 710 may include memory cells for storing data and perform a read or write operation on data or a test operation for testing a memory device.

The NMOS transistor NT is coupled between the second voltage transfer line 704 and the third voltage transfer line 705 and may be turned on when the internal circuit 710 is tested. If the semiconductor device performs a normal operation, the internal circuit 710 may use the internal boosted voltage VPP generated by the internal voltage generation unit 720. In an operation using the internal boosted voltage VPP, where an accurate voltage is required for a test operation, the internal circuit 710 may be driven using the second external voltage VPPEXT input through the second pad 702. In such a test operation, the second external voltage VPPEXT input through the second pad 702 may be transferred to the third voltage transfer line 705 so that the transferred voltage is used in a circuit operating based on the internal boosted voltage VPP.

The NMOS transistor NT blocks a leakage current that may occur between the second voltage transfer line 704 and the third voltage transfer line 705 until the second external voltage VPPEXT reaches a target level so that a stable test operation is performed. A test signal TEST applied to the gate of the NMOS transistor NT may be activated when a test operation is performed. For the second external voltage VPPEXT of the second voltage transfer line 704 to be transferred to the third voltage transfer line 705, an activation level of the test signal TEST may be higher than a target level of the second external voltage VPPEXT by the threshold voltage of the NMOS transistor NT. For example, if a target level of the second external voltage VPPEXT is 4.0 V and the threshold voltage of the NMOS transistor NT is 0.7 V, an activation level of the test signal TEST may be 4.7 V or more.

For reference, if a PMOS transistor is used instead of the NMOS transistor NT, the following issue may occur. In an operation using the internal boosted voltage VPP after the second external voltage VPPEXT is transferred to the third voltage transfer line 705, an activation level of the test signal TEST may have a value close to a base voltage (e.g., 0 V) because the PMOS transistor needs to be turned on using the test signal TEST. In this case, before the second external voltage VPPEXT reaches a target level (e.g., 4.0 V), the PMOS transistor is turned on and the second voltage transfer line 704 and the third voltage transfer line 705 are coupled. That is, the leakage current is generated. If the leakage current becomes excessive for any reason, a controller (not illustrated in FIG. 7) that applies the second external voltage VPPEXT may detect the excessive leakage current and stop the system. Accordingly, the aforementioned concern may be prevented by blocking the second voltage transfer line 704 and the third voltage transfer line 705 until the second external voltage VPPEXT reaches a proper level using the NMOS transistor.

Figure 8:
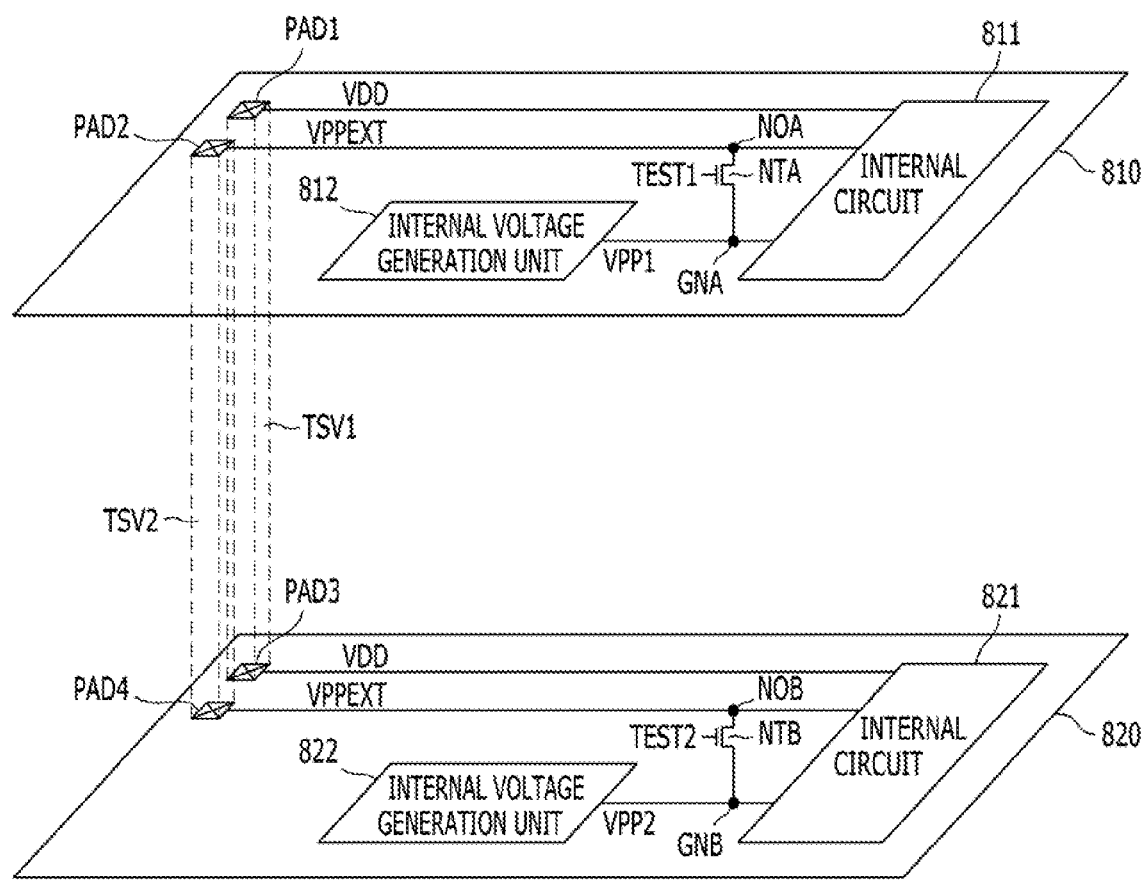
FIG. 8 a diagram illustrating a semiconductor device in accordance with an embodiment of the present invention.

FIG. 8 a diagram illustrating a semiconductor device in accordance with an embodiment of the present invention.

Referring to FIG. 8, the semiconductor device may include a first semiconductor chip 810, a second semiconductor chip 820, a first through chip via TSV1, and a second through chip via TSV2. The first and second semiconductor chips 810 and 820 may include respective voltage pads PAD1 and PAD2 and voltage pads PAD3 and PAD4, respective internal voltage generation units 811 and 821, respective internal circuits 812 and 822, and respective NMOS transistors NTA and NTB. Each of the first and second semiconductor chips 810 and 820 may include the semiconductor device of FIG. 7.

The internal circuits 812 and 822 of the first and second semiconductor chips 810 and 820 perform operations using voltages VDD and VPPEXT input through the corresponding voltage pads PAD1 to PAD4 and internal voltages VPP1 and VPP2 generated by the corresponding internal voltage generation units 811 and 812. During a test operation, it may be important to drive the semiconductor chips 810 and 820 in a similar fashion. The internal voltages VPP1 and VPP2 of the first and second semiconductor chips 810 and 820 may be slightly different due to fabrication imperfections between the first and second semiconductor chips 810 and 820. Accordingly, during a test operation, the external voltages VPPEXT may be used as boosted voltages in the internal circuits 812 and 822 of the first and second semiconductor chips 810 and 820.

Accordingly, during the test operation, NMOS transistors NTA and NTB may be turned on by activating respective test signals TEST1 and TEST2 corresponding to the first and second semiconductor chips 810 and 820, and the internal circuits 811 and 821 may be driven using the external voltages VPPEXT applied through the respective voltage pads PAD2 and PAD4 as boosted voltages. In this case, each of the NMOS transistors NTA and NTB blocks a leakage current that may occur between the respective nodes NOA and NOB to which the external voltage VPPEXT is applied and respective nodes GNA and GNB from which the respective internal boosted voltages VPP1 and VPP2 are generated until the external voltage VPPEXT reaches a target level so that a stable test operation is performed. If a PMOS transistor is used, a test may not be normally performed due to the concern described with reference to FIG. 7.

In the gates illustrated in the drawings, the gate marked VPPEXT may be driven using VPPEXT, and the other gate may be driven using VDD.

In accordance with an embodiment of the present invention, the generation of a leakage current may be may prevented by fixing a voltage of an internal node of an internal voltage generation circuit or by controlling the body voltage of a switching element included in the internal voltage generation circuit when a ramp-up (or a power-up) is performed.

Furthermore, in accordance with an embodiment of the present invention, an error, such as a booting failure, may be prevented from occurring in a semiconductor device by preventing the generation of leakage current in an internal voltage generation circuit.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a first voltage transfer line suitable for transferring a first external voltage input through a first voltage pad;
   a second voltage transfer line suitable for transferring a second external voltage input through a second voltage pad;
   a third voltage transfer line suitable for transferring an internal voltage;
   an internal circuit suitable for performing a predetermined operation using the voltages transferred to the first to third voltage transfer lines;
   an internal voltage generation unit suitable for generating the internal voltage by performing a charge pumping operation based on the second external voltage and an oscillation signal; and
   an NMOS transistor coupled between the second voltage transfer line and the third voltage transfer line, wherein the NMOS transistor is turned on when the internal circuit is tested.

2. The semiconductor device of claim 1, wherein a target level of the second external voltage is higher than a target level of the first external voltage.

3. The semiconductor device of claim 1, wherein the internal voltage generation unit blocks a current flowing through a generation node from which the internal voltage is generated when the first external voltage has a deactivated state.

4. The semiconductor device of claim 3, wherein the internal voltage generation unit comprises:
   a first control signal generation unit suitable for generating a first control signal activated to a level of the second external voltage when the first external voltage is activated;
   a second control signal generation unit suitable for generating a second control signal that equals the higher of the second external voltage and the internal voltage; and
   a voltage generation unit suitable for generating the internal voltage by performing a charge pumping operation based on the second external voltage and the oscillation signal, while blocking the current flowing through the generation node based on the first and second control signals.

5. The semiconductor device of claim 4, wherein the voltage generation unit comprises:
a first input unit suitable for fixing a voltage of a first input node to a specific level when the first control signal is activated, and toggling the voltage of the first input node based on the oscillation signal when the first control signal is deactivated;
a second input unit suitable for fixing a voltage of a second input node to a specific level when the first control signal is activated, and toggling the voltage of the second input node to an opposite phase to the voltage of the first input node based on the oscillation signal when the first control signal is deactivated; and
a charge pumping unit suitable for generating the internal voltage based on the voltages of the first and second input nodes and the second external voltage while blocking the current flowing through the generation node based on the second control signal.

6. The semiconductor device of claim 4, wherein the voltage generation unit comprises:
a signal generation unit suitable for generating a first signal by inverting the oscillation signal, a second signal by inverting the first signal, a third signal by inverting the second signal, and a fourth signal by inverting the third signal;
a signal transfer unit suitable for blocking the oscillation signal when the first control signal is activated, and transferring the fourth signal and the third signal as a first input signal and a second input signal, respectively, when the first control signal is deactivated;
a charge pumping unit suitable for generating the internal voltage based on the first and second input signals, the first and second signals, and the second external voltage while blocking the current flowing through the generation node based on the second control signal.

7. A semiconductor device, comprising:
a first semiconductor chip including first and second voltage pads, a first NMOS transistor, and a first internal voltage generation unit suitable for generating a first internal voltage based on a voltage input through the second voltage pad and a first oscillation signal, and a first internal circuit that is driven using voltages input through the first and second voltage pads and the first internal voltage, wherein the first NMOS transistor is coupled between the second voltage pad and a first generation node from which the first internal voltage is generated, and turned on when the first internal circuit is tested;
a second semiconductor chip including third and fourth voltage pads, a second NMOS transistor, and a second internal voltage generation unit suitable for generating a second internal voltage based on a voltage input through the fourth voltage pad and a second oscillation signal, and a second internal circuit that is driven using voltages input through the third and fourth voltage pads and the second internal voltage, wherein the second NMOS transistor is coupled between the fourth voltage pad and a second generation node from which the second internal voltage is generated, and turned on when the second internal circuit is tested;
a first through chip via suitable for coupling the first voltage pad and the third voltage pad to transfer a first external voltage; and
a second through chip via suitable for coupling the second voltage pad and the fourth voltage pad to transfer a second external voltage.

8. The semiconductor device of claim 7, wherein a target level of the second external voltage is higher than a target level of the first external voltage.

9. The semiconductor device of claim 7, wherein each of the first and second internal voltage generation units blocks a current flowing through the respective generation nodes when the first external voltage is in a deactivated state.

10. The semiconductor device of claim 9, wherein each of the first and second internal voltage generation units comprises:
a first control signal generation unit suitable for generating a first control signal activated to a level of the second external voltage when the first external voltage is activated;
a second control signal generation unit suitable for generating a second control signal that equals the higher of the second external voltage and the corresponding internal voltage; and
a voltage generation unit suitable for generating the internal voltage by performing a charge pumping operation based on the second external voltage and the oscillation signal while blocking the current flowing through the corresponding generation node based on the first and second control signals.

* * * * *